C. SHEARS.
MAGNETIC BRAKE.
APPLICATION FILED JAN. 21, 1909.
971,795.
Patented Oct. 4, 1910.
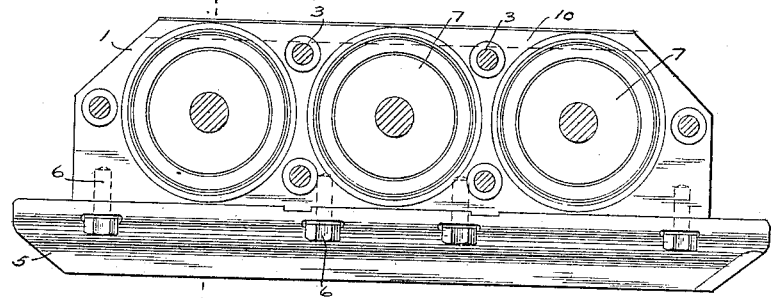
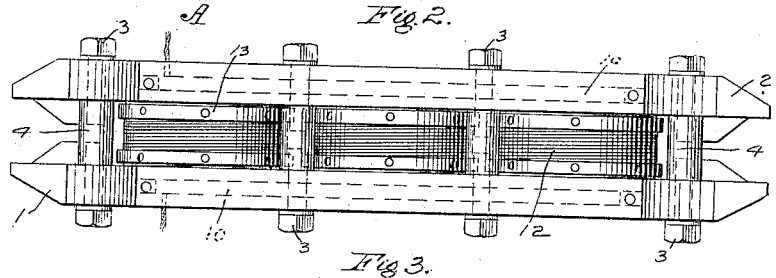
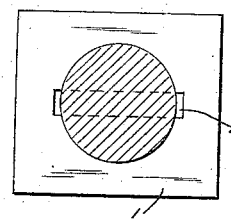
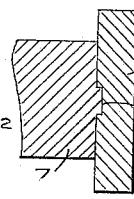
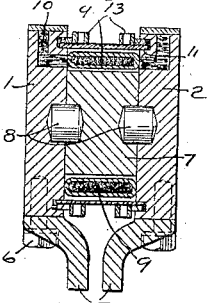
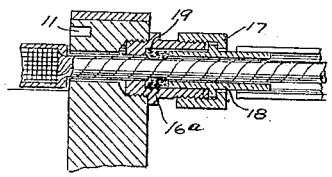
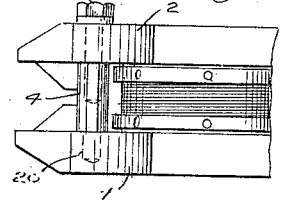
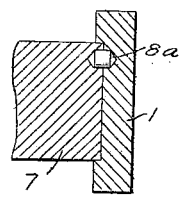
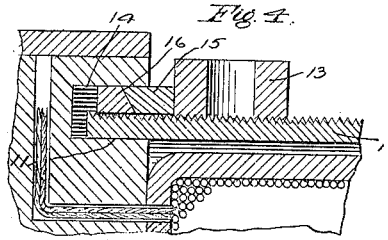
WITNESSES
Wm. M. Cady
INVENTOR
Cuthbert Shears
by E. H. Wright
Att'y.
THE NORRIS PETERS CO., WASHINGTON, D. C.

UNITED STATES PATENT OFFICE.

CUTHBERT SHEARS, OF MANCHESTER, ENGLAND, ASSIGNOR TO THE WESTINGHOUSE AIR BRAKE COMPANY, OF PITTSBURG, PENNSYLVANIA, A CORPORATION OF PENNSYLVANIA.

MAGNETIC BRAKE.

971,795.  Specification of Letters Patent.  Patented Oct. 4, 1910.

Application filed January 21, 1909. Serial No. 473,448.

*To all whom it may concern:*

Be it known that I, CUTHBERT SHEARS, a subject of the King of Great Britain, residing in Oakbank, Old Trafford, Manchester, England, have invented a certain new and useful Improvement in Magnetic Brakes, of which the following is a specification.

This invention relates to electric brakes and more particularly to an electro-magnetic brake shoe for track brakes.

With brake magnets as used in the well known track brakes where the magnet is close to the ground considerable difficulty has heretofore arisen in preventing moisture entering the coils, and interfering with the satisfactory operation of the magnet by reason of the damage to the insulation.

The object of the present invention is to improve upon the construction hitherto employed and to provide a brake shoe in which the parts of the magnet are of simple shape but are nevertheless capable of being readily assembled to form a magnet having as good a magnetic circuit and as high efficiency as those hitherto constructed and at the same time to so arrange the parts that the magnet coils may be effectually protected from damp or moisture.

According to the present invention the magnet comprises side plates which are magnetically connected by a suitable number of cylindrical cores. These cores have their ends finished in such a manner as to make a good magnetic joint with the respective side plates and are maintained in position relatively thereto by means of pins, or the whole or a portion of the end may be let in or bedded in the side plates. The cores are wound with magnetizing coils and around said coils is provided a sheath or casing, preferably of brass, the ends of which are received in annular grooves in the side plates. The outer ends of the casing are provided with screw-threads on which a nut is mounted, the movement of which is adapted to compress a suitable packing medium and thereby effect a tight joint between said casing and the side pieces. The ends of the magnetizable winding are brought out through grooves in the side plates, the grooves being afterward filled with pitch or otherwise sealed to prevent the entrance of moisture to the coils.

In the accompanying drawings; Figure 1 is a side elevation of a track brake magnet constructed in accordance with this invention; Fig. 2 a top plan view thereof, Fig. 3 a sectional view on line A—A of Fig. 1; Fig. 4 a view on an enlarged scale of a portion of the construction shown in Fig. 3; Fig. 5 a detail sectional view illustrating a construction for producing a waterproof joint at the cable outlet; Fig. 6 a plan view illustrating a modified form of means for connecting the side plates together; and Figs. 7, 8, and 9 detail views illustrating modifications in the method of connecting the magnet cores and side plates together.

Referring now to Figs. 1, 2, 3, and 4, the track brake magnet comprises side plates 1 and 2 connected together by means of bolts 3 passing through said side plates and engaging with distance pieces 4. The track brake shoes 5 adapted to bear against the rail are preferably formed separately from the side plates and connected thereto by means of bolts 6 so that the same may be easily removed and replaced when worn. The magnetizable cores 7 of the magnet are three in number and are retained in position and suitably connected to the side plates by means of studs or pins 8 adapted to enter into recesses formed in said cores and in the side plates 1 and 2. The magnetizable cores 7 are surrounded by coils 9 and the ends of the coils are passed through holes leading into grooves 10 formed in the side plates. The connections between the coils and the flexible cable leads are made in said grooves, and after the coils have been placed in position the grooves are filled with any suitable material, pitch for example, which effectually prevents access of water or moisture to the coils. Surrounding each coil and adapted to engage in circular slots 11 in each side plate is a cylindrical casing 12 provided with a screw thread on the outside on which is mounted a nut 13. In the circular slot 11 is located a soft rubber gasket 14 and between this gasket and the nut 13 on the outside of the casing is a ring 15 adapted, when the parts are assembled, to project within the slot and bear against a soft ring of packing 16 placed between the ring 15 and the rubber gasket, the casing 12 being placed in position surrounding each magnet coil, the parts are finally assembled and secured in position by the bolts 3. The ring 15 is then forced into the circular slot by means of the nut 13 and compresses the packing 16 and soft rubber gasket 14 so that a thoroughly air-tight and moisture-proof joint is provided between the casing and the side plates. It will be noted that the pins or studs 8 do not project through the side plates, and the bolts for connecting the side plates together are outside of the coils and casing, as the passages for the ends of the magnetizable coils are sealed as before explained, any possibility of moisture entering the casing and damaging the coils is avoided.

In the arrangement shown in Fig. 5 the ends of the coils are led through a hole in the side plates adapted to receive one end of an oppositely threaded hollow member 16$^a$ through which the flexible conductor passes and the entrance of air or moisture is prevented by a nut 17 on the opposite end of said hollow member which bears against and forces a flanged sleeve 18 against a packing ring 19 of rubber or other suitable material surrounding the conductor, thereby compressing the packing ring and effecting a tight joint around the cable.

In Fig. 6 the distance piece 4 is shown provided at one end with a screw threaded portion 20 engaging with one side plate and adapted at its other end to receive the end of the bolt 3, passing through the opposite side plate.

In the modification shown in Figs. 7 and 8, the core 7 is held in position by means of a feather 21 formed thereon and engaging with a slot 22 in the side plate, and in Fig. 9 the end of the core is embedded in the side plate and, as before explained, held rigidly in the side plates by means of a pin 8$^a$. The magnet is shown in Figs. 1 and 2 as having three cores but it may be provided with more or less than this number of cores if desired.

Having now described my invention, what I claim as new and desire to secure by Letters Patent, is:—

1. In a track brake magnet, the combination with side plates and a coil mounted between the plates, of a casing surrounding said coil and a packing joint uniting the casing with the side plates to prevent the entrance of moisture thereto.

2. A brake magnet comprising side plates, coils mounted between said plates, casings surrounding the coils, and a water tight packed joint between said casings and the side plates.

3. In an electro-magnetic brake, the combination with side plates and cylindrical coils disposed between said side plates, of concentric pins for holding said coils in position.

4. In an electro-magnetic brake, the combination with side plates and coils mounted intermediate said side plates, of pins carried in interior recesses in said side plates for holding the coils in position.

5. In a brake magnet, the combination with side plates and coils mounted between said side plates, of a casing surrounding a coil, a packing ring forming the joint between the casing and side plates and means for compressing the packing to effect a tight joint between the casing and side plates.

6. A magnetic brake shoe device comprising a body portion, a coil mounted on said body portion, the cable connection of which is carried in a groove in said body portion, and waterproof material within said groove to prevent the entrance of moisture.

7. A magnetic brake shoe device comprising side plates, coils intermediate said plates, the cable connections to which are carried in recesses in said side plates, and a waterproof substance within said recesses.

8. A brake magnet comprising side plates provided with recesses, coils disposed between said plates, pins mounted in said recesses for supporting the coils in position, and means for clamping the side plates and coils together.

In testimony whereof I have hereunto set my hand.

CUTHBERT SHEARS.

Witnesses:
JOHN S. PECK,
HAROLD HEAP.